Nov. 27, 1951 A. V. LOUGHREN 2,576,617

PULSE DISCRIMINATING SYSTEM

Filed Sept. 11, 1946

INVENTOR.
ARTHUR V. LOUGHREN
BY Harry C. Sage
ATTORNEY

Patented Nov. 27, 1951 2,576,617

UNITED STATES PATENT OFFICE 2,576,617

PULSE-DISCRIMINATING SYSTEM

Arthur V. Loughren, Great Neck, N. Y., assignor to Hazeltine Research, Inc., Chicago, Ill., a corporation of Illinois Application September 11, 1946, Serial No. 696,156

9 Claims. (Cl. 250—27)

Figures 1, 2:
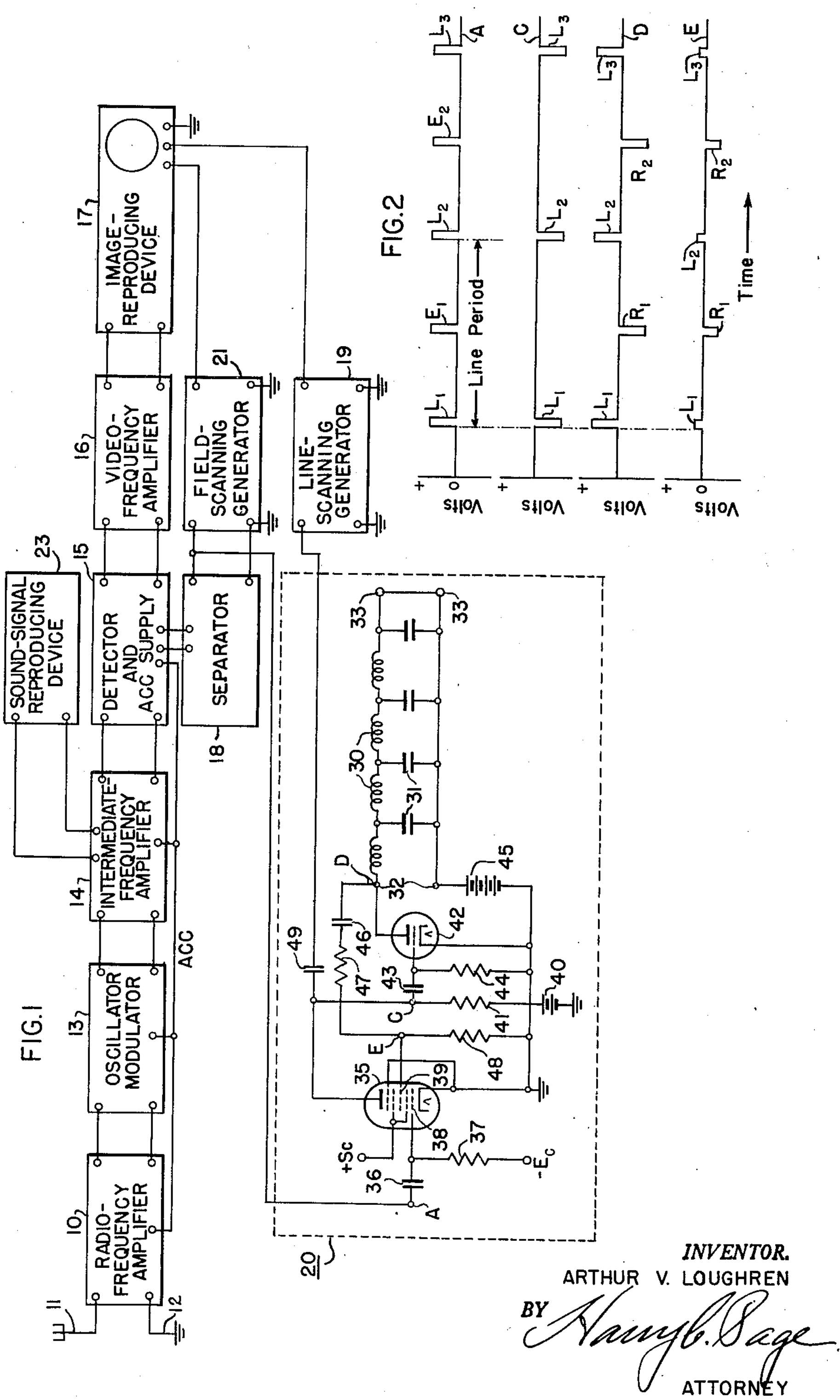

This invention relates, in general, to pulse-discriminating systems for translating desired signal pulses recurring at a given period and for distinguishing such pulses from undesired ones, especially those which are similar to the desired pulses, having the same period but occurring midway therebetween. While the invention may be used in a variety of installations, it is particularly suited for inclusion in the synchronizing-signal-separating apparatus of a television broadcast receiver and will be described in that connection.

A similar signal-translating system employed as a synchronizing-signal separator in a television receiver is disclosed in application Serial No. 692,533, filed August 23, 1946, in the name of Michael J. Di Toro, now Patent No. 2,522,706, dated September 19, 1950, and assigned to the same assignee as the present invention. The arrangement of that application features the use of a regenerative time-delay network adapted to produce images of applied pulses, the images being timed or delayed and having proper polarity to combine with and reinforce repeating pulses of a chosen period applied to the network. The combination of the image pulses and incident pulses results in an amplitude gain that is realized only for signals of the chosen period or harmonically related periods. Due to this fact a signal discrimination is achieved and the arrangement is, therefore, suited for use as a synchronizing-signal separator.

The usual television signal transmitted to a receiving system includes equalizing pulses during the leading and trailing portion of the field-retrace intervals. These pulses have one-half the period or twice the frequency of the line-scanning signals so that alternate ones may be relied upon to maintain line-scanning synchronization during such portions of the received signal. Since only alternate ones of the equalizing pulses are useful in continuing line synchronization, the others become undesired when considered with respect to the synchronizing control of the line-scanning system. The regeneration provided in the separator systems of the application referred to above may distinguish between the desired and undesired equalizing components, since the equalizing pulses are so few in number in comparison with the line-synchronizing pulses of the received television signal. However, it may be preferable to prevent the unwanted ones of the equalizing pulses from being translated through the separator at all, in accordance with the teachings of the preferred form of the instant invention.

It is an object of the present invention, therefore, to provide a new and improved pulse-discriminating system for translating desired signal pulses recurring at a given period and for distinguishing such pulses from similar but undesired ones of the same period which may occur midway between the desired pulses.

It is a specific object of the invention to provide a new and improved pulse-discriminating system for translating a television signal which discriminates in favor of the line-synchronizing pulses and those of the equalizing pulses useful in maintaining line synchronization.

In accordance with the invention, a pulse-discriminating system for translating desired signal pulses recurring at a given period and for distinguishing such pulses from similar but undesired ones of the same period which may occur midway therebetween comprises a multiple-reflecting time-delay means having a round-trip delay equal to one-half of the afore-mentioned period and so arranged that an applied pulse translated therealong alternately produces a reversed-polarity image of the applied pulse delayed with reference thereto by one-half of the aforementioned period and an image of the applied pulse delayed with reference thereto by the period. The system includes a wave-signal repeater coupled to the delay means for supplying thereto pulses received with a given polarity and so aranged that said pulses of given polarity when supplied to said delay means cause the repeater to experience a decrease in gain in the presence of reversed-polarity images of these pulses produced in the delay means and to experience an increase in gain in the presence of pulses produced in said delay means and delayed by said period. The system further includes means for applying desired and undesired pulses to the repeater with the aforesaid given polarity and means for deriving an output signal from the system in which the desired pulses appear with substantially greater amplitude than the undesired pulses.

The term "image" is used in this description and in the appended claims to denote an output signal obtained from a time-delay network in response to an applied pulse, the image having the same wave form as the original pulse except for the distortion which may be inherent in the network. Also, the term "original pulse" is intended to mean the signal or disturbance applied to the network which gives rise to such an image.

For a better understanding of the present invention, together with other and further objects thereof, reference is had to the following description taken in connection with the accompanying drawing, and its scope will be pointed out in the appended claims.

In the drawing, Fig. 1 is a schematic representation of a composite television carrier-wave-signal receiver embodying the invention in one form; and Fig. 2 comprises graphs utilized in explaining the operation of that arrangement.

Referring now more particularly to Fig. 1, the television carrier-wave-signal receiver there represented is of the superheterodyne type and includes a radio-frequency amplifier 10 of any desired number of stages having its input circuit connected to an antenna-ground system, 11, 12. Coupled in cascade with the output circuit of radio-frequency amplifier 10, in the order named, are an oscillator-modulator 13, an intermediate-frequency amplifier 14 of one or more stages, a wave-signal detector and automatic-contrast-control (ACC) supply 15, a video-frequency amplifier 16 of one or more stages, and an image-reproducing device 17 which may be of the cathode-ray tube type. A synchronizing-signal separator 18 is also coupled to an output circuit of detector 15. Its output circuit is directly coupled to a field-scanning generator 21 and is coupled by way of an intersynchronizing-signal separator 20, to be described more particularly hereinafter, to a line-scanning generator 19. The output circuits of generators 19 and 21 are connected to scanning elements of the reproducing device 17 in conventional manner. A contrast-control potential derived from the ACC supply of unit 15 is applied to the input circuits of one or more of the tubes of radio-frequency amplifier 10, oscillator-modulator 13 and intermediate-frequency amplifier 14 in well-known manner.

A sound-signal-reproducing unit 23 is also coupled to an output circuit of intermediate-frequency amplifier 14. It may include stages of intermediate-frequency amplification, a sound-signal detector, stages of audio-frequency amplification and a sound-reproducing device.

It will be understood that the various units thus far described, with the exception of intersynchronizing-signal separator 20, may be of any conventional design and construction. The details of such components are well known in the art, rendering a further description thereof unnecessary.

Considering briefly the operation of the receiver as a whole and assuming for the moment that unit 20 is a conventional intersynchronizing-signal separator, a desired modulated carrier-wave television signal is intercepted by antenna system 11, 12. This signal is selected and amplified in radio-frequency amplifier 10 and applied to oscillator-modulator 13 wherein it is converted to an intermediate-frequency signal. The intermediate-frequency signal is selectively amplified in amplifier 14 and supplied to detector 15 where its modulation components are derived. These components, which comprise video-frequency as well as synchronizing-signal components, are amplified in video-frequency amplifier 16 and thereafter applied to the brilliancy-control electrode of the cathode-ray tube included in reproducing device 17 to modulate the intensity of the beam thereof in accordance with the video-frequency modulation. The synchonizing-signal components or pulses of the received signal are separated from the video-frequency content in separator 18 and are used to synchronize the operation of line-scanning and field-scanning generators 19 and 21, respectively. These generators supply scanning signals of saw-tooth wave form which are properly synchronized with reference to the received television signal and applied to the deflecting elements of image-reproducing device 17, thereby to deflect the cathode-ray beam thereof in two directions normal to each other to reproduce the received television image. The automatic-contrast-control or ACC bias derived in unit 15 is effective to control the amplification of one or more of units 10, 13, and 14 to maintain the signal input to detector 15 and to the sound-signal-reproducing unit 23 within a relatively narrow range for a wide range of received signal intensities.

The sound-signal carrier wave accompanying the desired television-modulated carrier wave is concurrently intercepted by antenna system 11, 12. After selective amplification in radio-frequency amplifier 10, it is applied to oscillator-modulator 13 and converted to a sound-modulated intermediate-frequency signal. The latter is delivered to unit 23 wherein it is amplified and detected to derive the sound-modulation components which are further amplified and reproduced by the sound-reproducing device.

Referring now more particularly to the intersynchronizing-signal separator 20, this unit may be thought of as a system for translating desired signal pulses which recur at a given period and for distinguishing such pulses from other undesired ones. As will be apparent from the following, the system not only distinguishes from unwanted signals of different periods but also discriminates against undesired pulses of the same period and polarity as the desired ones but occurring midway therebetween. This is the relationship of the wanted to the unwanted equalizing pulses which appear in the early and final portions of the field-retrace intervals of a received television signal. The system comprises time-delay means responsive to an applied pulse for producing a delayed and reversed-polarity image thereof. This time-delay means is shown as a multiple-reflecting time-delay network, including a plurality of serially connected inductors 30, 30 and intermediate shunt-connected condensers 31, 31 arranged in the manner of a ladder-type delay network. The total time delay of such a network is determined by its total series inductance and total shunt capacitance. For the case under consideration, the parameters are chosen to introduce a one-way delay, that is, a delay in signal translation from one end to the other, which is equal to one-quarter of the time separation of succeeding line-synchronizing pulses of the received television signal to be translated. With this selection the round-trip delay, correponding to the time required for a signal applied to the near end to traverse the network to the far end and be returned again to the near end, is equal to one-half of the line period. The network has terminals 32, 32 at its near or input end and terminals 33, 33 at its opposite or far end. The near end effectively has an open-circuited termination for introducing reflection phenomenon without a polarity reversal, while the far end is short-circuited, representing a reflecting and polarity-reversing termination.

The separator 20 further includes a wave-signal repeater coupled to time-delay network 30, 31 for supplying thereto pulses received with a given polarity and subject to experience a decrease in gain in the presence of reversed-polarity images of such pulses produced by the delay network. This repeater is provided by a vacuum tube 35 having two control electrodes disposed in and individually effective to control the same electron stream. A converter tube has been shown, having input electrodes for receiving pulses with a given polarity, specifically with positive polarity, from separator 18. To this end, the output circuit of unit 18 is connected to the first control electrode 38 and cathode of the tube through a condenser 36, a grid-leak resistor 37, and a bias source indicated $-E_c$. A second control electrode 39 is associated with the input or near end of network 30, 31 through a connection, to be pointed out hereinafter, for controlling the gain of the tube in response to signals presented at the input terminals of the time-delay network. The output electrodes of the tube are coupled to a space-current source, shown as a battery 40, through an anode-load resistor 41. Operating potentials are applied to its screen electrodes in conventional manner from a source $+Sc$ while the suppressor is directly connected with its cathode.

The coupling between repeater 35 and the near end of the delay network is through an additional repeater comprising a vacuum tube 42 of the triode type. A condenser 43 and grid-leak resistor 44 connect the input electrodes of tube 42 with the output electrodes of converter 35. A space-current source, shown as another battery 45, is serially connected with the delay network to the output electrodes of tube 42, completing the coupling connections extending from the converter 35 to the near end of the network. A condenser 46 in conjunction with resistors 47 and 48 constitute a feed-back connection from the output circuit of tube 42 to the second control electrode 39 of converter 35, permitting regeneration of desired signal pulses and a gain control in the converter in response to signals appearing at the near end of the time-delay network.

The interconnection between unit 18 and separator 20, including the condenser 36 and resistor 37, comprises means for applying both desired and undesired pulses of a composite television signal to the converter 35 with positive polarity. A condenser 49 provides means coupled with the output electrodes of converter 35 for deriving an output signal from the system for application to the synchronizing circuit of line-scanning generator 19.

In considering the operation of the separator 20, it will be assumed that the constants of the circuits of tubes 35 and 42 are selected to reflect an impedance at the input to network 30, 31 which greatly exceeds the characteristic impedance thereof so that the input may be considered to be on open circuit, as indicated above. The operating potentials applied to tube 35 are such that positive polarity signals applied to its input electrode 38 develop a bias in the input circuit by grid-circuit rectification which is sufficient to bias the tube to anode-current cutoff in the intervals between applied pulses. It will be further assumed that the tube is able to translate an applied signal of positive polarity in the absence of a signal of negative polarity on its second control electrode 39. The response of the system will be discussed with reference to curves A, C, D, and E which designate potential variations at correspondingly identified points of the system.

The signal of curve A indicates the input to separator 20 from unit 18 and is shown as comprising similar pulses that are separated from one another by one-half the line period. In other words, the curve designates a portion of the field-retrace time of the composite synchronizing signal that includes equalizing pulses of twice the line frequency. For convenience, the pulses desired to maintain line synchronization have been designated $L_1$, $L_2$, and $L_3$, while the intermediate equalizing pulses denoted $E_1$ and $E_2$ serve no useful function in connection with line synchronization and may, consequently, be thought of as undesired if applied to the line-scanning generator. The desired pulses $L_1$, $L_2$, etc., are distinguished from the undesired ones by being in phase with the pulses which occur outside the field-retrace interval.

The first desired pulse $L_1$ is translated by repeater 35 and applied to the input circuit of the second repeater 42 as a signal variation of negative polarity. After further translation by tube 42, it is supplied to input terminals 32, 32 of the time-delay network as a positive pulse, shown by the component $L_1$ of curve D. Inasmuch as the delay network has reflecting terminations at both ends, it gives rise to multiple-reflection phenomena. Since its far end has a short-circuited termination, the first reflection or image $R_1$ of the applied pulse $L_1$ appears at the input terminals 32, 32 with negative polarity. Its delay relative to the first equalizing pulse $L_1$ is equal to one-half of the line period. This negative-polarity image or pulse $R_1$ is applied through condenser 46 to the second control electrode 39 of converter 35, arriving in time coincidence with the application of the unwanted equalizing pulse $E_1$ to the first control electrode 38. The negative-polarity signal on electrode 39 greatly reduces the gain of tube 35 and preferably blocks the tube for the duration of the negative signal, wherefor the undesired equalizing pulse $E_1$ is not translated to the output circuit of tube 35 nor to line-scanning generator 19.

The first image pulse $R_1$ which suppresses the first undesired equalizing pulse $E_1$ in the manner recited encounters an effectively open circuit at the near end of the delay network 30, 31 and is returned for another round-trip. In view of the short circuit at terminals 33, 33 the second image pulse is of positive polarity and is supplied to control electrode 39 of converter tube 35 simultaneously with the application of the next desired equalizing pulse $L_2$. Both of these pulses are of positive polarity, permitting the desired equalizing pulse $L_2$ to be translated through the system in substantially the same manner as that recited in connection with the first desired pulse $L_1$.

The output signal obtained from the system and applied to the line-scanning generator 19 has the wave form of curve C. It includes only the desired equalizing pulses, assuming the negative image pulses $R_1$ and $R_2$ to be effective completely to block converter 35 throughout the duration of each undesired pulse $E_1$ and $E_2$. Where this preferred mode of operation is not obtained, the gain of tube 35 is materially decreased throughout the duration of such undesired pulses so that the output signal applied to the line-scanning generator in any case has the desired pulses $L_1$—$L_3$ with substantially greater amplitude than the undesired pulses. For this reason the synchronizing circuit of line-scanning generator 19 is able to respond to the desired pulses and to discriminate against the undesired ones.

The described operation has been simplified by omitting reference to signal attenuation usually inherent in time-delay networks and a compensating regeneration featured by the present invention. The feed-back connection afforded by elements 46, 47, and 48 between the output circuit of tube 42 and control electrode 39 of tube 35 completes a regenerative loop between these tubes. It is apparent from curves A and D that during the translation of the desired pulse $L_1$ by the converter 35 a positive potential is applied to the feed-back circuit which increases the potential of control electrode 39. This potential swing of control electrode 39 augments that of first control electrode 38 or regenerates the pulse L. in its translation by tube 35. The regeneration of the next desired pulse $L_2$ is somewhat greater due to the fact that a positive image is also applied over the feed-back connection from the network 30, 31 to aid the regenerative process. The gain around the regenerative loop is to be maintained less than unity for most installations in order to avoid oscillations. The regeneration compensates, at least in part, the attenuation introduced by network 30, 31 and since the amount of regeneration realized is controlled to some extent by the action of the delay network and the image signals produced therein, the greatest gain of the system is manifested for desired pulses which occur at the line-scanning frequency. This aids the system in discriminating against undesired pulses which are not harmonically related to the line-scanning frequency. The positive pulse components of curve E indicate that the control electrode 39 becomes only slightly positive in response to positive pulses applied thereto over the feed-back connection. This is caused by current flow to control electrode 39 during such periods.

For operating intervals in which only the conventional line-synchronizing signals are applied to separator 20 the operation is generally similar to that described. Although negative-polarity images are still developed by the network 30, 31 and applied to converter 35 they occur intermediate the line-synchronizing pulses and do not impair the line-synchronizing function.

The described arrangement has the advantage of preventing unwanted ones of equalizing pulses from reaching the line-scanning generator. Furthermore, it exhibits its greatest gain to desired signal pulses which occur at the line-scanning frequency. These characteristics are highly desirable, giving more complete assurance of proper synchronization in response to the line-synchronizing pulses and to those of the equalizing pulses which carry on line synchronization during the leading and trailing portions of the field-retrace intervals of the received television signals. Since the arrangement utilizes a time-delay network having a delay of only one-quarter of the line period, it is of relatively small physical size which is also a desirable feature of the system.

While there has been described what is at present considered to be the preferred embodiment of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is.

1. A pulse-discriminating system for translating desired signal pulses recurring at a given period and for distinguishing said pulses from similar but undesired pulses of the same period which may occur midway between said desired pulses comprising: a multiple-reflecting time-delay means having a round-trip delay equal to one-half of said period whereby an applied pulse translated therealong alternately produces a reversed-polarity image of said pulse delayed with reference thereto by one-half of said period and an image of said pulse delayed with reference thereto by said period; a wave-signal repeater coupled to said delay means for supplying thereto pulses received with a given polarity and so arranged that said pulses of given polarity when supplied to said delay means cause said repeater to experience a decrease in gain in the presence of reversed-polarity images of such pulses produced in said delay means and to experience an increase in gain in the presence of pulses produced in said delay means and delayed by said period; means for applying said desired and said undesired pulses to said repeater with said given polarity; and means for deriving an output signal from said system in which said desired pulses appear with substantially greater amplitude than said undesired pulses.

2. A pulse-discriminating system for translating desired signal pulses recurring at a given period and for distinguishing said pulses from similar but undesired pulses of the same period which may occur midway between said desired pulses comprising: a multiple-reflecting time-delay means having a round-trip delay equal to one-half of said period whereby an applied pulse translated therealong alternately produces a reversed-polarity image of said pulse delayed with reference thereto by one-half of said period and an image of said pulse delayed with reference thereto by said period; a wave-signal repeater coupled to said delay means for supplying thereto pulses received with a given polarity and so arranged that said pulses of given polarity when supplied to said delay means cause said repeater to be blocked in the presence of reversed-polarity images of such pulses produced in said delay means and to experience an increase in gain in the presence of pulses produced in said delay means and delayed by said period; means for applying said desired and said undesired pulses to said repeater with said given polarity; and means for deriving an output signal from said system including said desired pulses but free of said undesired pulses.

3. A pulse-discriminating system for translating desired signal pulses recurring at a given period and for distinguishing said pulses from similar but undesired pulses of the same period which may occur midway between said desired pulses comprising: a multiple-reflecting time-delay means having a round-trip delay equal to one-half of said period whereby an applied pulse translated therealong alternately produces a reversed-polarity image of said pulse delayed with reference thereto by one-half of said period and an image of said pulse delayed with reference thereto by said period; a vacuum-tube wave-signal repeater having output electrodes coupled to said delay means for supplying thereto pulses received with a given polarity and having a control electrode coupled to said delay means effective to decrease the gain of said repeater in the presence of reversed-polarity images of such pulses produced in said delay means and effective to increase the gain of said repeater in the presence of pulses produced in said delay means and delayed by said period; means for applying said desired and said undesired pulses to said repeater with said given polarity; and means coupled to said output electrodes of said repeater for deriving an output signal from said system in which said desired pulses appear with substantially greater amplitude than said undesired pulses.

4. A pulse-discriminating system for translating desired signal pulses recurring at a given period and for distinguishing said pulses from similar but undesired pulses of the same period which may occur midway between said desired pulses comprising: a multiple-reflecting time-delay means having a round-trip delay equal to one-half of said period whereby an applied pulse translated therealong alternately produces a reversed-polarity image of said pulse delayed with reference thereto by one-half of said period and an image of said pulse delayed with reference thereto by said period; a vacuum-tube wave-signal repeater having input electrodes, having output electrodes coupled to said delay means for supplying thereto pulses received with a given polarity and having a control electrode coupled to said delay means effective to decrease the gain of said repeater in the presence of reversed-polarity images of such pulses produced in said delay means and effective to increase the gain of said repeater in the presence of pulses produced in said delay means and delayed by said period; means for applying said desired and said undesired pulses to said input electrodes of said repeater with said given polarity; and means coupled to said output electrodes of said repeater for deriving an output signal from said system in which said desired pulses appear with substantially greater amplitude than said undesired pulses.

5. A pulse-discriminating system for translating desired signal pulses recurring at a given period and for distinguishing said pulses from similar but undesired pulses of the same period which may occur midway between said desired pulses comprising: a multiple-reflecting time-delay means having a round-trip delay equal to one-half of said period whereby an applied pulse translated therealong alternately produces a reversed-polarity image of said pulse delayed with reference thereto by one-half of said period and an image of said pulse delayed with reference thereto by said period; a wave-signal repeater coupled to said network for supplying thereto pulses received with a given polarity and so arranged that said pulses of given polarity when supplied to said delay means cause said repeater to experience a decrease in gain in the presence of reversed-polarity images of such pulses produced in said network and to experience an increase in gain in the presence of pulses produced in said delay means and delayed by said period; means for applying said desired and said undesired pulses to said repeater with said given polarity; and means for deriving an output signal from said system in which said desired pulses appear with substantially greater amplitude than said undesired pulses.

6. A pulse-discriminating system for translating desired signal pulses recurring at a given period and for distinguishing said pulses from similar but undesired pulses of the same period which may occur midway between said desired pulses comprising: a multiple-reflecting time-delay means having a round-trip delay equal to one-half of said period whereby an applied pulse translated therealong alternately produces a reversed-polarity image of said pulse delayed with reference thereto by one-half of said period and an image of said pulse delayed with reference thereto by said period; a wave-signal repeater coupled to said network for supplying thereto pulses received with a given polarity and subject to experience of decrease in gain in the presence of reversed-polarity images of such pulses produced in said network and to experience an increase in gain in the presence of pulses produced in said delay means and delayed by said period; means for applying said desired and said undesired pulses to said repeater with said given polarity; and means for deriving an output signal from said system in which said desired pulses appear with substantially greater amplitude than said undesired pulses.

7. A pulse-discriminating system for translating desired signal pulses recurring at a given period and for distinguishing said pulses from similar but undesired pulses of the same period which may occur midway between said desired pulses comprising: a multiple-reflecting time-delay means having a round-trip delay equal to one-half of said period whereby an applied pulse translated therealong alternately produces a reversed-polarity image of said pulse delayed with reference thereto by one-half of said period and an image of said pulse delayed with reference thereto by said period; a wave-signal repeater coupled to said network for supplying thereto pulses received with a given polarity and subject to experience a decrease in gain in the presence of reversed-polarity images of such pulses produced in said network and to experience an increase in gain in the presence of pulses produced in said delay means and delayed by said period; means for applying said desired and said undesired pulses to said repeater with said given polarity; and means for deriving an output signal from said system in which said desired pulses appear with substantially greater amplitude than said undesired pulses.

8. A pulse-discriminating system for translating desired signal pulses recurring at a given period and for distinguishing said pulses from similar but undesired pulses of the same period which may occur midway between said desired pulses comprising: a multiple-reflecting time-delay means having a round-trip delay equal to one-half of said period whereby an applied pulse translated therealong alternately produces a reversed-polarity image of said pulse delayed with reference thereto by one-half of said period and an image of said pulse delayed with reference thereto by said period; a wave-signal repeater coupled to said network for supplying thereto pulses received with a given polarity and subject to experience a decrease in gain in the presence of reversed-polarity images of such pulses produced in said network and to experience an increase in gain in the presence of pulses produced in said delay means and delayed by said period; means for applying said desired and said undesired pulses to said repeater with said given polarity; and means for deriving an output signal from said system in which said desired pulses appear with substantially greater amplitude than said undesired pulses.

9. A pulse-discriminating system for translating desired signal pulses recurring at a given period and for distinguishing said pulses from similar but undesired pulses of the same period which may occur midway between said desired pulses comprising: a time-delay network responsive to an applied pulse for producing a delayed image thereof reversed in polarity and delayed by one-half of said period; a wave-signal repeater; means for coupling said repeater to said network for supplying thereto pulses received by said repeater with a given polarity, for constituting with said repeater a regenerative stage for at least partially compensating signal attenuation in said network, for decreasing the gain of said repeater in the presence of reversed-polarity images of such pulses produced in said network and for increasing the gain of said repeater in the presence of pulses produced in said delay means and delayed by said period; means for applying said desired and said undesired pulses to said repeater with said given polarity; and means for deriving an output signal from said system in which said desired pulses appear with substantially greater amplitude than said undesired pulses.

ARTHUR V. LOUGHREN.

REFERENCES CITED

The following references are of record in the file of this patent:

UNITED STATES PATENTS

| Number | Name | Date |
|---|---|---|
| 2,224,134 | Blumlein | Dec. 10, 1940 |
| 2,252,599 | Lewis | Aug. 12, 1941 |
| 2,255,839 | Wilson | Sept. 16, 1941 |